July 24, 1934.   O. J. TUBBS   1,967,915
ATTACHMENT FOR PLANTERS
Filed March 21, 1933   2 Sheets-Sheet 2
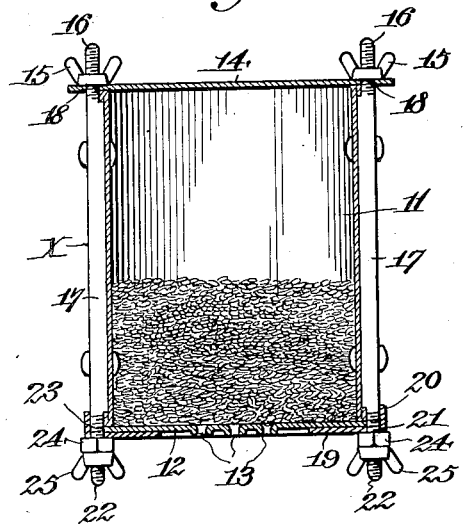
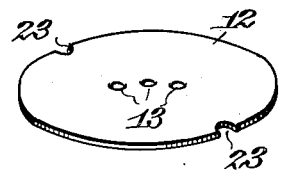
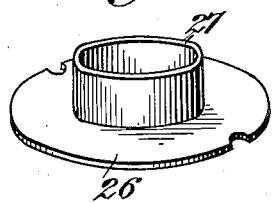
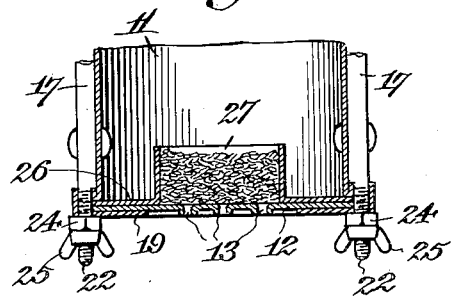
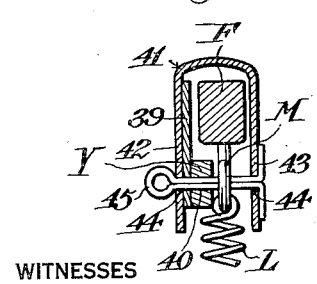
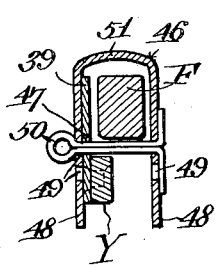
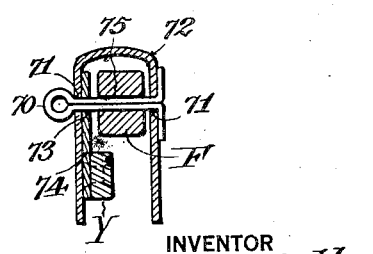
INVENTOR
Oscar J. Tubbs.
BY
Munn, Anderson, Stanley, Foster & Liddy
ATTORNEYS.
WITNESSES
Geo. W. Naylor
Hugh H. Ott Patented July 24, 1934

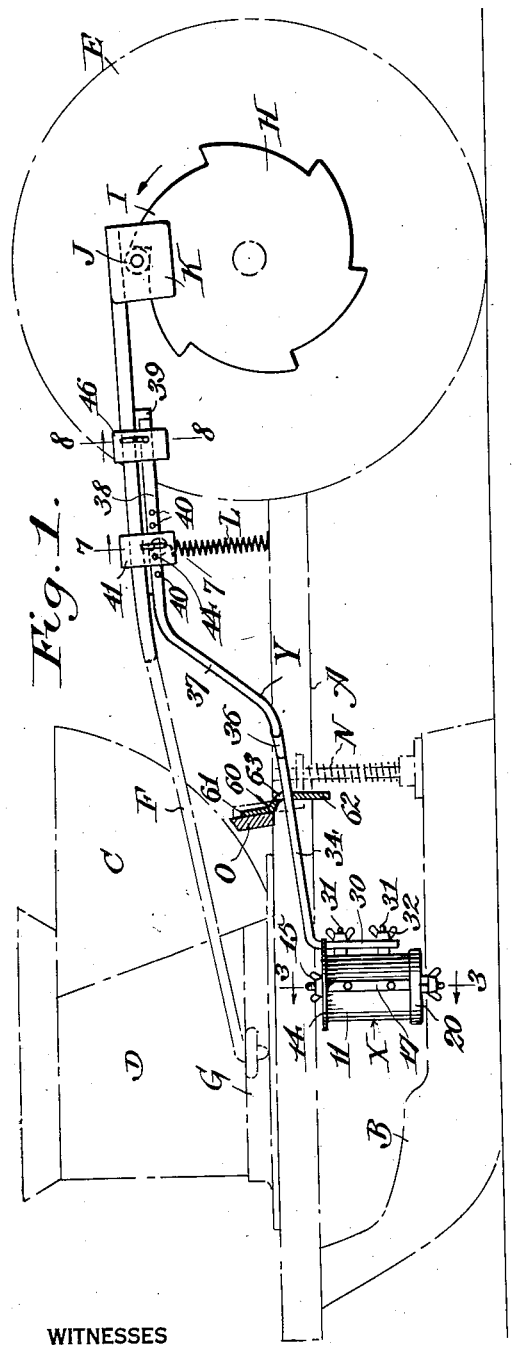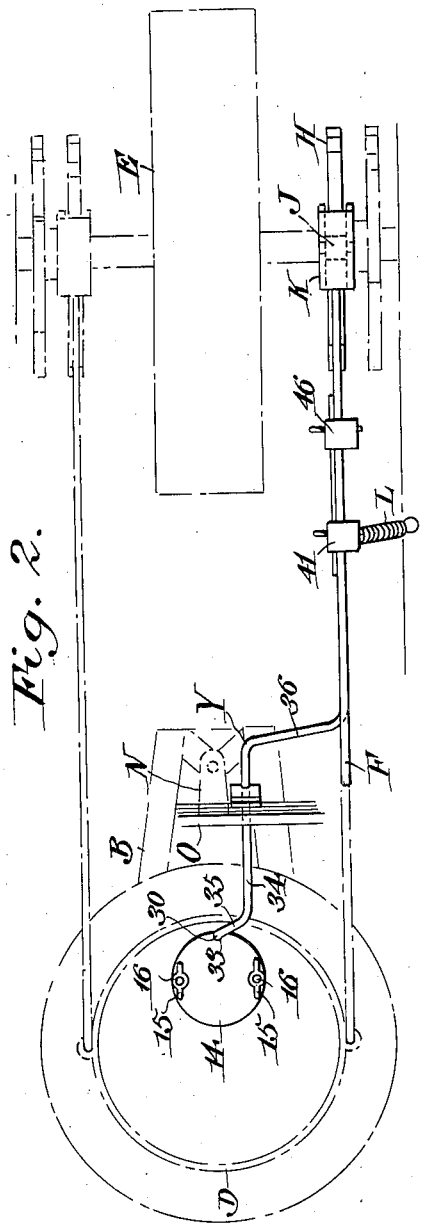

1,967,915

UNITED STATES PATENT OFFICE 1,967,915

ATTACHMENT FOR PLANTERS

Oscar J. Tubbs, Winslow, Maine

Application March 21, 1933, Serial No. 661,977

11 Claims. (Cl. 111—75)

This invention relates generally to seed planters, and comprehends an attachment which is designed to be applied to and operated by the mechanism of a planter for large seeds, such as corn, beans, peas or the like, so as to adapt the planter for use in the planting of smaller seed, such as carrot, beet, turnip, parsnip, cabbage, tomato, cucumber or flower seeds.

The invention aims to provide an attachment of the indicated character which is so constructed that a corn planter or other large seed planter may be made to accommodate the attachment without any alteration thereto which would affect its use in its ordinary capacity and whereby said attachment may be readily associated with or removed from the planter so that the same may be optionally employed with or without the attachment.

The invention further resides in the provision of a novel form of coupling means for operatively connecting the seed container supporting arm of the attachment to the seed box and fertilizer hopper shaker bar of the planter to compensate for relative lateral movements between the arm and bar.

The invention further embodies in an attachment of the character previously set forth, a guide bearing for the arm of the attachment, by virtue of which the arm is supported intermediate its ends and is mounted for guided movement while disposed in a non-interfering position to the elements of the planter.

The invention further contemplates novel forms of coupling devices for connecting the arm of the attachment to the shaker bar of the planter so as to permit of such a range of adjustment as will permit of the proper location of the seed container with reference to the plow and the seed coverers, as well as the proper functioning of the attachment.

Another object of the invention is to provide a seed container for an attachment of the character set forth which is of a novel construction to facilitate its use in connection with smaller seeds of various types.

Other objects of the invention are to provide an attachment of the character set forth and for the purpose specified, which attachment is comparatively simple and not unduly complicated, which may be economically produced and readily adapted to a planter and which is highly efficient for its intended purpose.

With the above recited and other objects in view, reference is had to the following description and accompanying drawings, in which there are exhibited several embodiments or examples of the invention, while the claims define the actual scope of the same.

In the drawings:

Figure 1 is a side view showing portions of a planter in full lines and the remainder in broken lines, and illustrating in full lines the attachment in applied position.

Figure 2 is a plan view thereof.

Figure 3 is an enlarged vertical sectional view through the seed container, taken approximately on the line indicated at 3—3 in Figure 1.

Figures 4 and 5 are perspective views of bottom plates used in connection with the seed container.

Figure 6 is a fragmentary vertical sectional view of the lower portion of the seed container, showing the manner in which the bottom plate shown in Figure 5 is used in connection therewith.

Figure 7 is an enlarged sectional view taken approximately on the line 7—7 of Figure 1, particularly illustrating a part of the coupling which connects the attachment arm to the shaker bar of the planter.

Figure 8 is a similar view taken approximately on the line 8—8 of Figure 1, illustrating another part of the coupling.

Figure 9 is a similar view illustrating an alternative form of coupling.

Referring to the drawings by characters of reference, A designates generally the frame of a planter for large seed, such as is ordinarily used for planting corn, beans or peas, which planter includes the usual plow B, seed box C, fertilizer hopper D and rear wheel E. In this type of planter, the seed box C and fertilizer hopper D are agitated or shaken as a unit by means of shaker bars F which are operatively connected with the platform G and extend rearwardly therefrom to be actuated by cams H turned by and with the wheel E, the teeth I of the cams engaging with cam rollers J extending transversely across the furcations K at the rear end of the shaker bars, which furcations straddle the cams H. In order to yieldably swing the rear ends of the shaker bars F downwardly and to tension the same against upward movement, coiled contractile springs L are employed which are anchored to the frame A at their lower ends and are connected by screw eyes M at their upper ends, which screw eyes are anchored in the shaker bars F and depend from the under side thereof. This substantially describes the type of planter with which the attachment of the present invention is designed to be used.

The attachment constituting the present invention includes a seed container designated generally by the reference character X, which preferably is composed of a body 11 of cylindrical form having a bottom plate 12 removably fitted over the lower end of the body and formed with seed outlet apertures 13 and a top or cap plate 14 which is removably fitted over the upper end of the body. As shown, the top or cap plate 14 is secured in place by thumb nuts 15 which are screwed onto upstanding threaded studs 16 which constitute the upper extremities of vertical bolt bars 17, and which extremities extend through apertures 18 in the top or cap plate 14. The bottom plate 12 is held in place by an annular rim 19 which has a marginal upstanding flange 20 which telescopically fits over the bottom plate 12 and which receives through openings 21 therein the threaded studs 22 constituting the lower ends of the bolt bars 17. The bottom plate 12 is provided with peripheral notches which register with the openings 21 and afford provision for the reception of the threaded studs 22, onto which nuts 24 and 25 are threaded to retain the bottom and its holder in place.

In instances where the farmer has only a small amount of seed to sow, instead of scattering this small amount of seed over the entire area of the bottom plate 12, which might result in a failure to uniformly feed and sow the seed, an auxiliary bottom plate 26 is employed, such as illustrated in Figures 5 and 6 of the drawings. This bottom plate is of annular form and has an upstanding annular flange 27 at its inner marginal edge or periphery, and said auxiliary bottom plate is superimposed on the apertured bottom plate 12 and defines together therewith, a seed compartment of restricted size and area which insures a positive uniform feeding of the seeds from the seed container.

The attachment further includes a seed container supporting arm, which is designated generally by the reference character Y and which is preferably in the nature of a rod definitely shaped or contoured to fit the planter and function therewith. As shown, the arm or rod Y has a depending flattened forward terminal 30, to which is detachably connected the seed container 11 by means of threaded studs 31 which project radially outward from the body 11 and over which are engaged apertured portions of the terminal 30, after which thumb screws 32 are applied. It will also be observed that the upper portion of the terminal extends through a peripheral notch 33 in the top or cap plate 14 so that combined with the studs and nuts 32, the terminal 30 and seed container 11 are rigidly joined. The arm or rod Y further includes a rearwardly and upwardly inclined portion or lead 34 which extends longitudinally of and slightly to one side of the longitudinal center of the planter, due to a slight offset 35 which joins the forward end of the portion 34 with the depending terminal 30. This disposes the portion 34 out of the way and in a non-interfering relation to the adjustable tension means N for the seed coverers. The arm or rod Y further includes a substantially intermediate laterally offset portion 36 joined to the rear end of the portion or lead 34 and to an upwardly and rearwardly inclined portion or lead 37, where the rod or arm is completed by a rear flattened terminal 38 extending substantially parallel to and below the rear portion of the shaker bar F.

In order to provide means for coupling the arm Y to the shaker bar F so that the reciprocations of the shaker bar are imparted to the arm Y while compensating for the relative lateral movement of the shaker bar F which is caused by the arc of movement of its forward end, the following means of connection is employed: The terminal portion 38 has secured to the inner face thereof and upstanding therefrom, an elongated plate 39, which plate 39 and portion 38 of the arm adjacent their forward ends are provided with aligned cotter pin receiving openings 40, a number of said openings being provided for the purpose of adjustment. A U-shaped clip or clevis 41 is provided to straddle the forward portion of the terminal 38, the shaker bar F and the plate 39, and the depending side arms or furcations 42 and 43 thereof are formed with aligned apertures 44 to be brought into registry with the desired aligned apertures 40 in the plate 39 and terminal 38, after which a cotter pin 45 is inserted which extends through the screw eye M, thereby coupling the arm Y with the shaker bar F. The rear portion of the plate 39 and the terminal 38 are straddled by a second inverted U-shaped clip or clevis 46 which also embraces the shaker bar F at a rearwardly spaced point. At this point, the plate 39 is formed with an aperture 47 located above the terminal 38, and the depending side lugs or furcations 48 are formed with a plurality of sets of aligned vertically spaced apertures 49 which are optionally brought into alignment with the aperture 47 and receive therethrough a cotter pin 50 which underlies the lower edge of the shaker bar F and confines the same between the upper portion of the furcations and the bight portion 51 of the clip or clevis 46. It will be observed that in both of the clips or clevises 41 and 46, the spacing between the side lugs or furcations is greater than the width or transverse measurement of the shaker bar F so that room is left for the lateral play or relative lateral movement of the shaker bar F with reference to the coupled rear terminal 38 of the arm Y, which relative movement is caused by the arcuate path of movement of the forward end of the shaker bar F.

In order to support and guide the arm at a point between the rear terminal 38 and the forward terminal 30 where the seed container is carried, a guiding and bearing bracket 60 is employed which includes a base 61 which is attached to the cross piece O forming a part of the planter structure. The bracket further includes a rearwardly offset depending portion 62 which is formed with an opening 63, through which the portion or lead 34 of the arm extends.

In use, when the attachment is to be applied, the application of the attachment to the planter requires practically no alteration to the planter structure other than the securement of the bearing and guiding bracket 60, and this bracket is so located that it does not interfere with the ordinary functioning of the planter. When the attachment is to be used, it is only necessary to remove the usual seed chutes (not shown) which extend downwardly from the seed box C and after inserting the arm Y through the guiding and bearing bracket 60, the clips or clevises are engaged over the shaker bar F and the cotter pins inserted. The removal of the attachment is just as simple and requires no more time than its application, inasmuch as the cotter pins have only to be removed, the clips taken off and the arm Y withdrawn from the bracket 60. With the attachment applied as shown in Figures 1 and 2, the forward movement of the planter through the coupled arm Y imparts a shaking or agitation to the seed container X to feed the seed therein through the outlet openings 13 in the bottom plate 12. At the same time, if desired, the fertilizer hopper D may be utilized to function in its ordinary manner to distribute fertilizer during the planting operation.

As an alternative form, there is shown in Figure 9 a modified arrangement of the coupling, in which a cotter pin 70 extends through aligned apertures 71 in the clip or clevis 72 and through an aperture 73 in the plate 74 which is secured to the arm Y, said cotter pin passing through a transverse opening 75 in the shaker bar F. In all respects, the attachment is identical with the preferred embodiment and the functioning of the coupling is the same as that previously described.

While there have been described and shown several preferred forms of the invention, it is to be understood that variations and modifications which fall within the range and scope of the appended claims may be resorted to when desired.

What is claimed is:

1. An attachment for a planter for large seed having a reciprocal seed box shaker bar actuated by the movement of the planter to adapt said planter to function for the planting of smaller seed, said attachment including a seed container having a bottom formed with seed outlets of a size proportionate to the seeds to be planted and means for supporting said seed container from and for agitating the same by the seed box shaker bar of the planter.

2. An attachment for a seed planter of the type which includes a reciprocatory seed box shaker bar actuated by forward movement of the planter, said attachment comprising a seed container having a seed outlet, an arm by one end of which the container is carried and means for coupling the arm at the other end to the seed box shaker bar of the planter so that the seed container of the attachment is agitated thereby to drop the seed.

3. An attachment for a seed planter of the type which includes a reciprocatory element actuated by a forward movement of the planter, said attachment comprising a container having an outlet, an arm by one end of which the container is carried and means for coupling the arm at its other end to the reciprocatory element so that the container of the attachment is agitated to cause the feeding of the contents of the container through the outlet.

4. An attachment for a seed planter of the type which includes a reciprocatory element actuated by a forward movement of the planter, said attachment comprising a container having an outlet, an arm by one end of which the container is carried and means for flexibly coupling the arm at its other end to the reciprocatory element so that the container of the attachment is agitated to cause the feeding of the contents of the container through the outlet, said means being so constructed as to compensate for and permit of relative lateral movements between the arm and element.

5. An attachment for a seed planter of the type which includes a reciprocatory element actuated by a forward movement of the planter, said attachment comprising a container having an outlet, an arm by one end of which the container is carried and means for flexibly coupling the arm at its other end to the reciprocatory element so that the container of the attachment is agitated to cause the feeding of the contents of the container through the outlet, said means including an inverted U-shaped clip of a width greater than that of the shaker bar so as to compensate for and permit of relative lateral movements between the arm and element and a guiding and bearing bracket secured to and depending from a fixed portion of the planter for guidedly supporting the arm between its point of connection with said element and the end which carries the container.

6. An attachment for a planter for large seed having a reciprocal seed box shaker bar actuated by the movement of the planter to adapt said planter to function for the planting of smaller seed, said attachment including a seed container having a bottom formed with seed outlets of a size proportionate to the seeds to be planted and means for supporting said seed container from and for agitating the same by the seed box shaker bar of the planter, said means consisting of an arm shaped to provide a forward terminal to which the container is attached and by which it is carried, an intermediate portion and a rear terminal extending parallel to the seed box shaker bar and means for coupling the rear terminal of said arm to the shaker bar.

7. An attachment for a planter for large seed having a reciprocal seed box shaker bar actuated by the movement of the planter to adapt said planter to function for the planting of smaller seed, said attachment including a seed container having a bottom formed with seed outlets of a size proportionate to the seeds to be planted and means for supporting said seed container from and for agitating the same by the seed box shaker bar of the planter, said means consisting of an arm shaped to provide a forward terminal to which the container is attached and by which it is carried, an intermediate portion and a rear terminal extending parallel to the seed box shaker bar and means for coupling the rear terminal of said arm to the shaker bar, said coupling means including an inverted U-shaped clip of a width greater than that of the shaker bar so as to compensate for relative lateral movements between the arm and bar.

8. An attachment for a planter for large seed having a reciprocal seed box shaker bar actuated by the movement of the planter to adapt said planter to function for the planting of smaller seed, said attachment including a seed container having a bottom formed with seed outlets of a size proportionate to the seeds to be planted and means for supporting said seed container from and for agitating the same by the seed box shaker bar of the planter, said means consisting of an arm shaped to provide a forward terminal to which the container is attached and by which it is carried, an intermediate portion and a rear terminal extending parallel to the seed box shaker bar and means for coupling the rear terminal of said arm to the shaker bar and a guiding and bearing bracket secured to and depending from a fixed portion of the planter for cooperation with the intermediate portion of the arm to guide and support the arm in its movements.

9. An attachment for a planter for large seed having a reciprocal seed box shaker bar actuated by the movement of the planter to adapt said planter to function for the planting of smaller seed, said attachment including a seed container having a bottom formed with seed outlets of a size proportionate to the seeds to be planted and means for supporting said seed container from and for agitating the same by the seed box shaker bar of the planter, said means consisting of an arm shaped to provide a depending forward terminal to which the container is rigidly and detachably connected and by which it is carried, a slightly laterally offset rearwardly and upwardly inclined portion extending longitudinally of the planter, an intermediate upwardly and rearwardly inclined portion offset laterally and disposed in approximately the same vertical plane as that of the shaker bar and a rear terminal extending parallel to and directly below the shaker bar and means for coupling the rear terminal of said arm to the shaker bar.

10. An attachment for a planter for large seed having a reciprocal seed box shaker bar actuated by the movement of the planter to adapt said planter to function for the planting of smaller seed, said attachment including a seed container having a bottom formed with seed outlets of a size proportionate to the seeds to be planted and means for supporting said seed container from and for agitating the same by the seed box shaker bar of the planter, said means consisting of an arm shaped to provide a depending forward terminal to which the container is rigidly and detachably connected and by which it is carried, a slightly laterally offset rearwardly and upwardly inclined portion extending longitudinally of the planter, an intermediate upwardly and rearwardly inclined portion offset laterally and disposed in approximately the same vertical plane as that of the shaker bar and a rear terminal extending parallel to and directly below the shaker bar and means for coupling the rear terminal of said arm to the shaker bar and an apertured guiding and bearing bracket secured to and depending from a fixed member of the planter for guidedly supporting the slightly laterally offset portion of the arm.

11. An attachment for a seed planter of the type which includes a reciprocatory seed box shaker bar actuated by forward movement of the planter, said attachment comprising a seed container having a seed outlet, an arm by one end of which the container is carried and means for coupling the arm at the other end to the seed box shaker bar of the planter so that the seed container of the attachment is agitated thereby to drop the seed, said coupling means including an inverted U-shaped clip embracing the arm and bar and apertured portions of the clip arm and bar and a connecting element extending through said apertured portions when registered.

OSCAR J. TUBBS.